United States Patent [19]
Hickey

[11] 3,984,209
[45] Oct. 5, 1976

[54] POROUS ALUMINUM BODY
[75] Inventor: John S. Hickey, Burnt Hills, N.Y.
[73] Assignee: General Electric Company, Syracuse, N.Y.
[22] Filed: May 24, 1974
[21] Appl. No.: 473,197

[52] U.S. Cl. .......................... 29/191.2; 29/192 R; 75/20 F
[51] Int. Cl.² .......................................... B23P 3/00
[58] Field of Search .............. 29/182.1, 182, 192 R, 29/191.2, 192, 197, 197.5; 75/20 F; 264/48, DIG. 63

[56] References Cited
UNITED STATES PATENTS

| | | |
|---|---|---|
| 3,049,799 | 8/1962 | Breining .................... 29/191.2 X |
| 3,135,044 | 6/1964 | Mote, Jr. et al. ............... 29/183 X |
| 3,750,399 | 8/1973 | Moore ....................... 122/238 X |

Primary Examiner—Walter R. Satterfield
Attorney, Agent, or Firm—Robert J. Mooney

[57] ABSTRACT

A porous aluminum body comprised of aluminum pellets bonded together with a substantial portion of said space therebetween remaining open and a method for making such body wherein said aluminum pellets are (1) coated with a powdered solder mixed with a paste-like flux, (2) placed in a mold, and (3) heated in a substantially inert environment to a temperature sufficient to bond adjacent aluminum pellets together.

1 Claim, 1 Drawing Figure

POROUS ALUMINUM BODY

BACKGROUND OF THE INVENTION

This invention pertains to the brazing of metals and, more particularly, to improvements in the brazing of particles of aluminum and its alloys to form a shaped porous aluminum body, and to bodies so formed.

Heretofore metallic porous bodies such as utilized, for example, in porous plug burners and porous plug heat exchanger systems such as shown in U.S. Pat. No. 3,750,399 and U.S. Pat. No. 3,740,313, respectively, have typically been made by fusing together tin-plated copper pellets according to conventional methods. Another well known application for such porous bodies is a filter body for liquids such as gasoline. However, because of the costliness of materials for such bronze porous bodies and because, in some applications, weight may be an important consideration, it is desirable to form such bodies of aluminum. In the past, attempts to do this have not been successful because of the tenacious layer of oxide that coats any aluminum surface exposed to oxygen in any quantity.

Generally, the soldering or brazing of aluminum bodies has heretofore been typically done either in air using a flux or in a vacuum using an active material, which active material doesn't require a separate flux to permit the formation of a bond between the aluminum bodies. Both such techniques are old and well known for large, non-porous aluminum body constructions. In both of these techniques, the tenacious aluminum oxide is removed by chemical reaction which allows the solder to flow over and bond to a clean aluminum surface.

When the soldering or brazing of large body assemblies has been done in air, the removal of chemical by-products and the formation of fillets has been relatively easy. However, when such techniques have been applied to aluminum pellets, difficulty has been encountered because the flux and solder completely fill the majority of the spaces or interstices between the aluminum pellets. One reason for this is thought to be that, in air, an excess of flux is required to allow the particles to bond, which excess causes the solder to flow and fill the interstices.

Fluxes typically used in aluminum brazing include highly corrosive boron and fluorine compounds. For this reason, techniques which include the use of such fluxes for brazing aluminum bodies in a substantially inert environment likewise have generally been found to be unacceptable because of the difficulty in removing the chemical by-products and the reactive metal vapors released by the chemical reactions between the flux and the aluminum bodies. These metal vapors are detrimental to the formation of a body of high structural integrity as well as being detrimental to the vacuum chamber itself if they are improperly distributed or filtered off from the brazing chamber.

Fluxless brazing techniques have also been found to be unacceptable for constructing porous bodies of small aluminum pellets for similar reasons. The removal or distribution of the corrosive gas vapors, also including water vapor, which are created or released during the brazing process, is made extremely difficult because of the necessity of enclosing the aluminum pellets within a tightly closed mold for shaping of the body to be formed.

"Inert environment" is used herein to refer to inert gas atmospheres and to vacuum or partial vacuum atmospheres. The critical factor in this definition is the fact that the "inert environment" be substantially inert with respect to aluminum; i.e., the environment has a reduced amount of oxygen — either as free oxygen or in a compound such as water — relative to the amount normally contained in the air.

It is an object of this invention to provide a porous body of aluminum pellets.

It is another object of this invention to provide a method for forming porous aluminum bodies.

It is still another object of this invention to form a porous aluminum body in a substantially inert environment utilizing a minimum of flux.

It is yet another object of this invention to provide a method for forming a porous aluminum body whereby excess brazing material does not deleteriously affect the bonding of aluminum pellets in a porous configuration.

These and other objects will be apparent from the following description taken in conjunction with the appended claims.

SUMMARY OF THE INVENTION

In accordance with the invention herein, a porous aluminum body is formed by the steps of coating aluminum pellets with a paste-like composition of flux and powdered solder, and thereafter disposing said coated aluminum pellets in a mold and heating said coated pellets in an inert environment to a temperature sufficient to melt the solder but insufficient to melt the aluminum pellets, thereby to form a porous aluminum body conforming to the shape of the mold.

DESCRIPTION OF THE PREFERRED EMBODIMENTS

Figure 1:
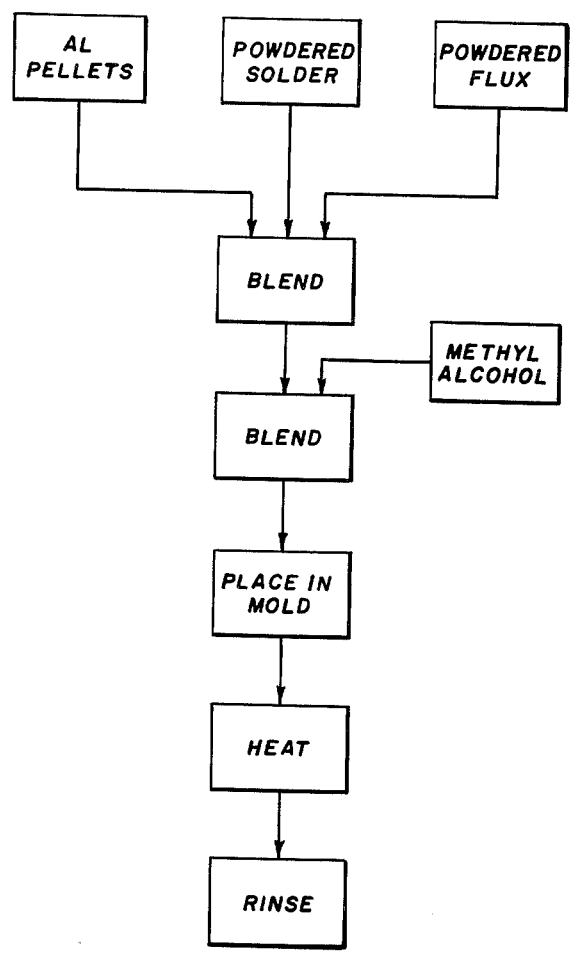
FIG. 1 is a block diagramatic view of a method in accordance with the invention herein for making a porous aluminum body.

In FIG. 1, there is illustrated a block diagram of the method for constructing a shaped porous aluminum body in accordance with this invention. The starting materials for the method are comprised of aluminum pellets, powdered solder and powdered flux. These materials are blended together, in a dry form, so as to form a substantially uniform mixture thereof. Methyl alcohol or other convenient solvent for the powdered flux is then added to the blended starting materials, which materials are then blended with the alcohol to form an adhesive mixture of the flux and solder so as to coat the aluminum pellets therewith. After the pellets have a substantially uniform coating of the flux and solder on them, the coated pellets are placed in a mold corresponding to the desired article shape. The mold and coated particle assembly is then heated, in an inert environment, to a temperature above the melting point of the solder but less than the melting point of the aluminum pellets. Typically, this temperature is between 600°C and 620°C.

After heating, the body is removed from the mold and then subjected to a two-step cleaning process. First, the majority of excess solder and flux is removed with a hot water rinse. The remainder is removed in the second step by subjecting the porous body to a nitric acid bath which will also remove other chemical by-product residues. Optionally, the acid remaining in the body can be removed by a second hot water rinse.

In accordance with this invention, it has been discovered that only the solder powder which is caught between adjacent aluminum pellets enters into the braze or bond formed between the pellets. The remaining untrapped solder powder melts and remains floating or suspended in the flux, and the majority of it can be washed away during the cleaning process. The untrapped solder apparently does not alloy with the aluminum pellets because it fails to come into intimate contact therewith. Accordingly, it can be seen that the excess solder is not detrimental to the formation of a porous body as is the case in other aluminum brazing techniques. Additionally, this method permits the utilization of minimal amounts of flux, thereby to mitigate the problems caused by the corrosive vapors normally associated with flux brazing of aluminum in vacuum equipment as well as the excessive filling of the interstices which has been found to occur when brazing aluminum pellets in an air atmosphere.

Figure 2:
FIG. 2 is a cross-sectional view of a porous aluminum body in accordance with the invention herein.

FIG. 2 is a cross-sectional view of a porous aluminum body constructed in accordance with this invention, which body is comprised of aluminum pellets or shot 11 bonded together by metallurgical bonds 13 with a plurality of interconnected pores or interstices 15 formed therebetween. The aluminum pellets 11 have a size between that of the openings of a 16 mesh sieve and that of the openings of a 30 mesh sieve, or, as such dimensions are conventionally expressed by those skilled in the art, a size between −16 mesh and +30 mesh. (As is conventionally used by those skilled in the art and as used hereinafter, the negative (−) designation means that the particles will pass through a particular size mesh while the positive (+) designation means that the particles will be retained on a particular size mesh.) However, all commercially available pellets, which range in size between −8 mesh and +40 mesh, have been found to be brazable.

The pellets 11 may have a generally globular or spheroidal shape as shown in FIG. 2. However, the particle shape is not critical to the formation of a porous body, and other particles shaped such as spheres, tear-shaped bodies, and cylindrical sections formed by cutting aluminum wire into short sections, as well as "conditioned" particle shapes have been found to be brazable. "Conditioned" particle shapes are represented by, for example, cut wire, which has been peened to have an approximate spherical shape, and comminuted flakes, which have been formed into a substantially hollow spherical shape.

In accordance with the preferred embodiment, the particles 11 are formed from a high purity aluminum alloy (99% or greater). However, as will be understood by those skilled in the art, lower purity pellets can be utilized. This will generally lower the melting point of the pellets and, accordingly, would require brazing temperature of the process to be more closely monitored. Additionally, the use of lower purity pellets could prevent or be detrimental to the formation of strong bonds between the pellets.

The pores 15 formed between the adjacent aluminum pellets 11 are interconnected so as to form open channels through the body. Because of this feature, the bodies have utility, for example, as a filter for fluids or as a porous plug burner for providing an interface between a combustion chamber and a fuel/air mixture supple such as disclosed in the aforementioned U.S. Pat. No. 3,750,399.

The metallurgical bonds 13 formed between particles in accordance with this invention have a high integrity and, accordingly, the bodies formed thereof can withstand substantial tensile and compressive stresses.

In forming metallurgical bonds 13 any of the conventional silicon and aluminum braze alloys, in fine powder form, can be utilized as the brazing material. One preferred silicon and aluminum braze alloy which has been found to work well for the purposes of this invention is Alcoa 718, in a fine powder form, having a particle size of less than −325 mesh and a liquidus of approximately 577°C.

Also, the powdered flux can be selected from any of the conventional aluminum brazing fluxes. A preferred flux is Alcoa No. 33 aluminum brazing flux.

The preferred amounts of the solder and flux mixed as starting materials with the aluminum pellets are, for the solder, 5% to 10% by weight of the aluminum pellets and, for the flux, 40% to 60% by weight of the solder. In the preferred embodiment of this invention, these starting materials, in the aforesaid proportions, are first blended in a dry form. Then a small amount of liquid is added to the dry mixture. The amount should be sufficient to moisten the powders but not to cause any fluidity of the powders, the powders thus being formed into an adhesive paste-like mixture. An amount between 1½ to 2½% by weight of the aluminum pellets has been found to be an acceptable proportion in accordance with this invention. Methyl alcohol is preferred, but other liquids such as water can be substituted therefor. However, it will be realized by those skilled in the art that water is less desirable because it tends to react with the aluminum pellets.

The mixture with the methyl alcohol added is then blended to cause the powdered solder, with the flux and alcohol acting as an adhesive or glue, to form a thin coating around the aluminum pellets. After this, the mixture, which resembles coarse, damp sand, can be poured into a mold and either vibrated and tamped by conventional methods to cause the mixture to settle and form a substantially uniform, high density mixture of shape corresponding to the mold. Next, the mold is put in vacuum equipment to reduce the oxygen level. It has been found that a vacuum of 50 microns is acceptable, while a vacuum of over 200 microns is not acceptable. The preferred range is less than 150 microns. Atmospheres of argon and nitrogen used at atmospheric pressure have also been found to be acceptable for the purpose of this invention and may be used in lieu of a vacuum atmosphere.

While the pressure is being reduced in the vacuum equipment, heat is being applied to bring the mold and its contents to a temperature, preferably, between 600°C and 630°C. It has been found that this is the optimum range so that some solder flows and alloys with the adjacent pellets. While the temperature can be varied from these ranges, it will be recognized by those skilled in the art that the critical temperature parameters are those between the melting point of the solder, as a lower limit, and the melting point of pure aluminum, as the upper limit (660°C being the melting point of pure aluminum). If the upper limit temperature is exceeded, the porous body will obviously be destroyed and form a solid aluminum mass.

To further illustrate the invention disclosed herein, an embodiment of this invention can be constructed in accordance with the following procedure:

As starting materials, select 1400 grams of 99+% pure aluminum pellets of −13 mesh to +30 mesh, 140 grams of finely powdered Alcoa No. 718 silicon-aluminum braze alloy and 70 grams of Alcoa No. 33 flux. These materials are placed in a ball mill blender. If desired, the flux can first be passed through a 30-mesh sieve just before mixing because it is deliquescent and tends to form lumps. These materials are then blended dry in the blender until a uniform mixture is formed, then 25 grams of methyl alcohol are added and blended until the individual aluminum pellets are coated with a fairly uniform layer of solder powder held thereon by the flux and alcohol mixture in past-like form. This mixture, which has the form of damp, coarse sand, is then poured into a mold. The mold is vibrated and tamped so as to form a compact, uniform mixture of the materials. The mold is then put in vacuum equipment and subjected to a vacuum of less than 150 microns while it is heated to a temperature of between 600 and 630°C. Upon reaching the required temperature to melt the solder, the particles become bonded together and the heater power is then turned off and the assembly allowed to cool. The porous body is then removed from the mold and subjected to two rinsing processes to remove the excess solder and flux. The first rinse is a hot water rinse and the second is a dilute nitric acid bath which removes the remainder of the chemical residue left after the hot water bath. The fillets joining each aluminum particle can be seen to be uniform, and there are very few completely filled regions.

Porous bodies formed in accordance with this example have been found to have a density between 1.52 to 1.55 g/cm$^3$, the density of the aluminum pellets being 2.71 g/cm$^3$. Accordingly, the porosity (ratio of volume of the pores to the volume of the body) is between 0.438 and 0.426.

It has been further determined that varying the degree of compacting, vibrating, and compressing and/or varying the brazing temperature has little effect upon the density of the body formed as a result thereof. Bodies formed thereby have been found to have a density varying between 1.49 g/cm$^3$ and 1.62 g/cm$^3$.

To further illustrate the structural integrity of porous bodies constructed in accordance with the above method, compression tests were made on porous bodies of aluminum pellets having a size between −12 to +30 mesh and −16 to +30 mesh, respectively. Tests were made on two samples of a body comprised of the −12 to +30 mesh pellets. The tests showed that the bodies had a compressive strength of approximately 2700 pounds per square inch. Tests were also made for three samples of a body comprised of the −16 to +30 mesh size. The tests showed that for these three samples the compressive strength ranged between 3100 and 3500 pounds per square inch.

It is thought that the compressive strength should not vary significantly with variation in pellet size. This is explained by the fact that, if spherical shape is assumed for the pellet shape, the surface area of the pellets which enters into the bond formed between any two pellets would be proportional to size of the pellet. The variation in test results is thought to be explainable by experimental error as well as the inability to accurately duplicate the control parameters of the method for constructing the porous bodies.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desired to secure by Letters Patent of the United States is:

1. A porous aluminum body of predetermined shape comprising:
   a. a plurality of solid aluminum pellets having a particle size of between −8 mesh and +40 mesh arranged in a confined mass of said predetermined shape;
   b. adjacent portions of said pellets being permanently connected by individual metallurgical bonds of solder material;
   c. said solder material consisting of an alloy of aluminum and silicon of an amount such as to constitute less than 5 to 10% by weight of said aluminum pellets;
   d. the unbonded surface portions of said pellets defining a plurality of interconnected interstices between said pellets constituting open channels for accommodating gas flow through the body and providing a substantially uniform porosity throughout said body of between 0.3 and 0.6; and
   e. said body having a compressive strength of at least 1,000 pounds per square inch.

* * * * *